(12) United States Patent
Hu

(10) Patent No.: US 10,157,552 B2
(45) Date of Patent: Dec. 18, 2018

(54) EDUCATIONAL LAMP

(71) Applicant: Antonio Hu, Belmont, MA (US)

(72) Inventor: Antonio Hu, Belmont, MA (US)

(73) Assignee: Brainy Yak Labs LLC, Belmont, MA (US)

(*) Notice: Subject to any disclaimer, the term of this patent is extended or adjusted under 35 U.S.C. 154(b) by 0 days.

(21) Appl. No.: 15/638,963

(22) Filed: Jun. 30, 2017

(65) Prior Publication Data

US 2018/0012513 A1 Jan. 11, 2018

Related U.S. Application Data

(60) Provisional application No. 62/358,220, filed on Jul. 5, 2016.

(51) Int. Cl.
| | |
|---|---|
| *F21S 6/00* | (2006.01) |
| *G09B 23/18* | (2006.01) |
| *G09B 1/00* | (2006.01) |
| *G09B 25/00* | (2006.01) |
| *F21Y 115/00* | (2016.01) |
| *F21W 121/00* | (2006.01) |
| *F21Y 115/10* | (2016.01) |
| *F21Y 113/17* | (2016.01) |

(52) U.S. Cl.
CPC .............. *G09B 23/183* (2013.01); *F21S 6/00* (2013.01); *G09B 1/00* (2013.01); *G09B 25/00* (2013.01); *F21W 2121/00* (2013.01); *F21Y 2113/17* (2016.08); *F21Y 2115/00* (2016.08); *F21Y 2115/10* (2016.08)

(58) Field of Classification Search
CPC .... F21S 6/00; F21S 10/00; F21S 9/00; F21W 2121/00; F21Y 2113/17; F21Y 2115/00; F21Y 2115/10; G09B 1/00; G09B 23/183
See application file for complete search history.

(56) References Cited

U.S. PATENT DOCUMENTS

| | | | |
|---|---|---|---|
| 8,970,130 B1* | 3/2015 | So ........................ | F21S 6/002 315/297 |
| 2010/0237789 A1* | 9/2010 | Feng ...................... | F21S 9/03 315/192 |
| 2011/0037391 A1* | 2/2011 | Lai ...................... | H05B 33/0815 315/119 |
| 2012/0139427 A1* | 6/2012 | Tsai ................... | H05B 33/0854 315/158 |
| 2013/0057160 A1* | 3/2013 | Adams ............... | H05B 33/0845 315/160 |
| 2014/0285113 A1* | 9/2014 | Huang ............... | H05B 37/0272 315/297 |

FOREIGN PATENT DOCUMENTS

| | | | |
|---|---|---|---|
| CN | 105546400 | * | 2/2016 |
| CN | 205191330 | * | 4/2016 |

* cited by examiner

*Primary Examiner* — Ali Alavi
(74) *Attorney, Agent, or Firm* — Duane Morris LLP

(57) ABSTRACT

A kit for assembling and decorating a lamp that educates children about scientific, engineering, and artistic principles. Assembling the lamp housing teaches children about fasteners, tools, and mechanisms. Assembling the electronics teaches children about electronic components. Controlling the lights teaches children about lighting, colors, and software.

20 Claims, 18 Drawing Sheets

EDUCATIONAL LAMP

CROSS-REFERENCE TO RELATED APPLICATIONS

This application claims priority to U.S. Provisional Application No. 62/358,220 filed on Jul. 5, 2016, which is included by reference herein in its entirety for all purposes.

FIELD

The present invention relates to educational devices. Specifically, the present invention relates to a kit for providing the materials and instructions necessary for a student to mechanically and electrically assemble a lamp.

BACKGROUND

Although jobs increasingly require technical skills, there is growing concern that there are not enough people interested in studying technical topics that will allow them to become qualified for jobs in technology. To ensure the United States does not lag behind in technology, the government, schools, corporations, and other organizations are developing programs to get children interested in STEM (Science, Technology, Engineering, Math). The hope is that increasing the number of children interested in technology will lead to more college graduates majoring in technical fields and accepting jobs in technology.

Children's products, including toys, may have an influence on a person's interest in STEM topics during childhood and beyond. It is common for engineers and scientists to reflect on an early interest in technology stemming from playing with Lego sets, electronics kits, or video games. While there exist plenty of tech toys and kits for boys (many of them robot or vehicle themed), there are few options designed with girls in mind.

Research and testing with children has shown that girls ages 8-12 are commonly interested in arts and crafts and room decor. Therefore, the device described herein combines technology with play patterns that girls already identify with to create a product that will teach girls about STEM topics in a fun and exciting way. In fact, a variation on STEM includes arts and is known as STEAM (Science, Technology, Engineering, Art, Math), and this device teaches art through the opportunity to decorate and personalize the product. While the initial target market is girls, boys have also expressed significant interest in the product. Therefore, the device describe herein can appeal to both genders as well as across a larger age range.

SUMMARY

The education device described herein addresses the need for STEM education by teaching principles related to mechanical engineering, electrical engineering, software engineering, the physics of light, and art.

To address education related to mechanical engineering, the lamp of the present disclosure includes a plurality of housing components to be assembled by a child. In a preferred embodiment, a lamp base is comprised of an upper base housing and a lower base housing which combine to house many of the electronic components. A transparent lamp body houses the lighting elements and extends upwardly from the lamp base. A removable shade element attaches to the top of the transparent lamp body and can hold decorative elements. The child learns how to use tools and fasteners to assemble the lamp housing, including the lamp base, lamp body, and shade element, thereby learning about mechanical principles.

To address education related to electrical engineering, a preferred embodiment of the lamp includes a plurality of electronic components including an on/off switch, a battery pack, a rotary switch, a plurality of potentiometers, a plurality of light emitting diodes (LEDs), and a processor, such as a microcontroller. These electronic components combine to form a lamp circuit with controllable LED colors, brightness levels, and on/off patterns. The child learns the names and functions of the electronic components while connecting them with electrical wires, thereby completing the circuit and learning about electrical principles.

An alternate embodiment of the lamp includes a plurality of electronic components including an on/off switch, a battery pack, a plurality of switches, a plurality of light emitting diodes (LEDs), and a processor, such as a microcontroller.

To address education related to software engineering, in another aspect of the educational device, the LED colors, brightness levels, and on/off patterns are controlled by the child via software on a computing device such as a smartphone, an electronic tablet, or a computer. The software may expose the child to features such as conditional statements, loops, and variables. By interacting with the software, the child creates a customized light show while learning about software principles.

To address education related to wireless communications, in an alternate embodiment, the lamp may interact with other room decor products. For example, the lighting effects of the lamp may be synchronized with lighting effects displayed by wall-mounted, decorative lights. In another example, an alarm clock may control the lamp's lighting effects so that it displays bright colors when it is time to wake in the morning and dim, soothing colors at bedtime.

To address education related to the physics of light, a preferred embodiment of the lamp uses individually addressable RGB (red, green, and blue) LEDs that can be controlled to display a wide range of colors. The child adjusts the red, green, and blue values of the LEDs via switches, potentiometers or software, thereby learning how mixing colors with light differs from mixing colors with pigment.

To address education related to art, a preferred embodiment of the lamp includes decorative components including sequins, ornaments, stickers, markers, paints, and the like. The child is free to customize the lamp to her desire, thereby gaining experience with artistic techniques.

Information in the form of instruction manuals, websites, and videos supplement the educational value of the lamp kit. Simple instruction manuals combining text and graphics permit easy assembly while providing background information on technology for users interested in learning more about the product. Video instructions may be used by those who prefer a demonstration of the assembly process. Online content may be explored for in-depth information about the technology including details about electronic components, circuit design, software programming, and the like.

Other objects and features of the present invention will become apparent by a review of the specification and appended figures.

BRIEF DESCRIPTION OF THE DRAWINGS

These and other features and advantages of the present invention will be more fully disclosed in, or rendered obvious by, the following detailed description of the preferred embodiments of the invention, which is to be considered together with the accompanying drawings wherein like numbers refer to like parts and further wherein.

DETAILED DESCRIPTION

Figure 1:
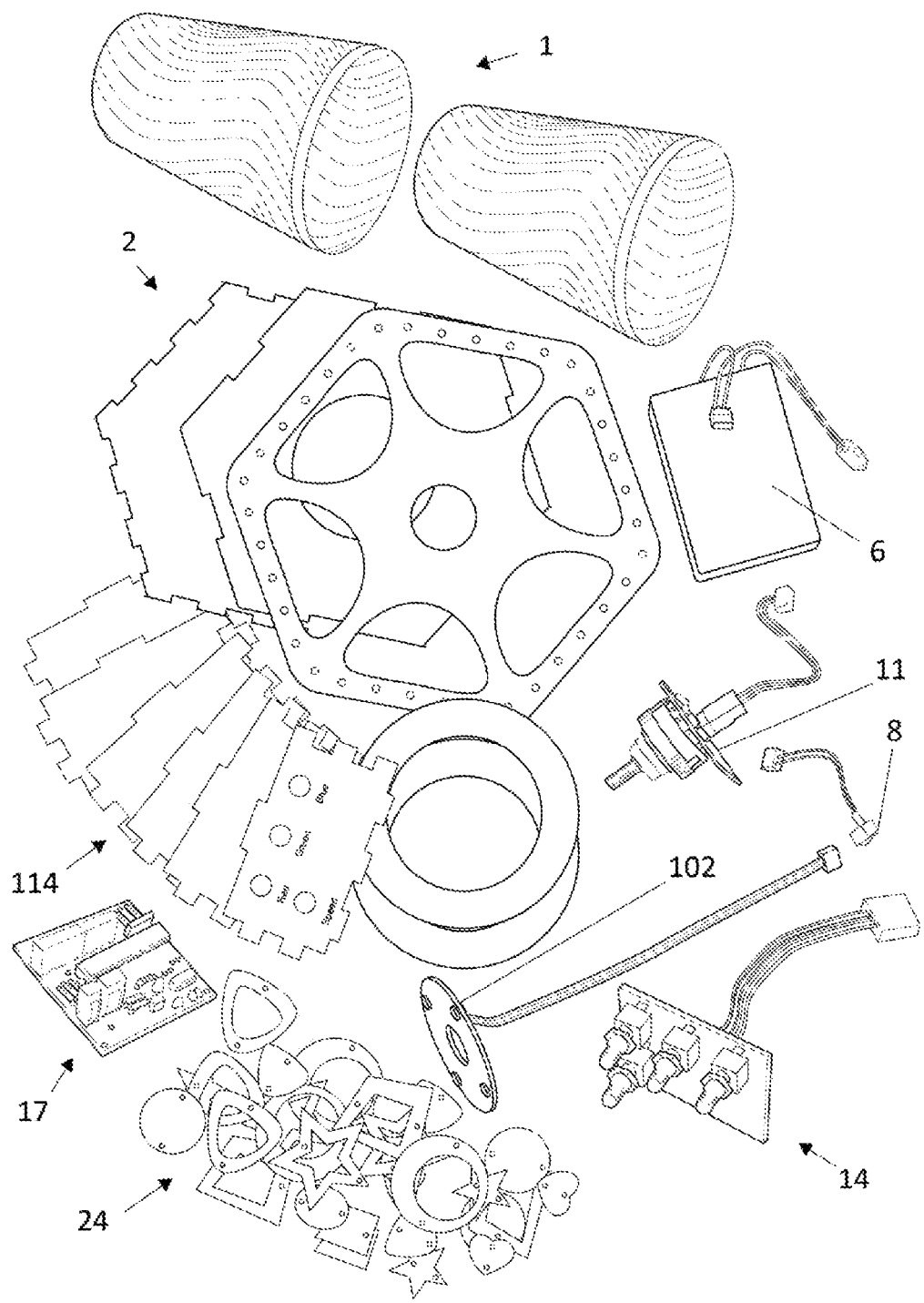
FIG. 1 is a perspective view of the components that comprise one embodiment of a lamp kit.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. While reference is made to certain materials of construction, it should be understood that these materials are exemplary and the use of alternative materials are contemplated within the scope of this disclosure. In the claims, means-plus-function clauses, if used, are intended to cover the structures described, suggested, or rendered obvious by the written description or drawings for performing the recited function, including not only structural equivalents but also equivalent structures.

The present disclosure describes a kit for assembling and decorating a lamp that educates children about scientific, engineering, and artistic principles.

Figure 2:
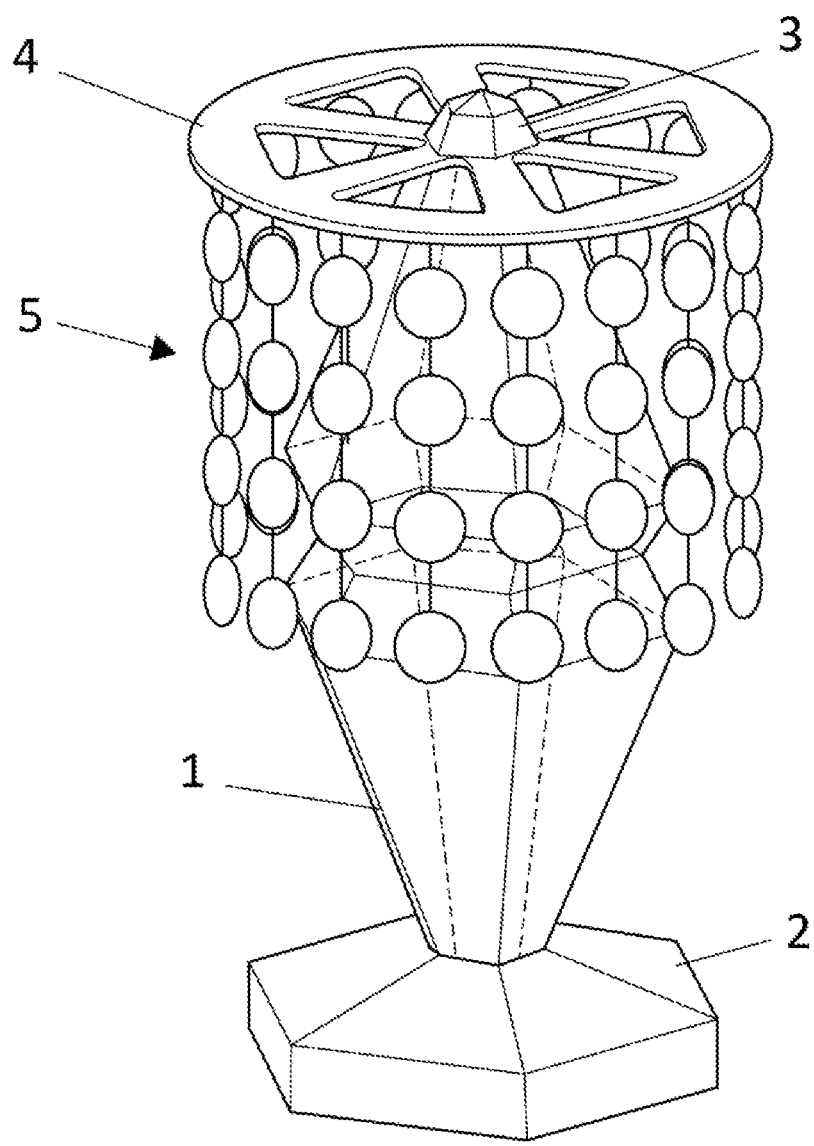
FIG. 2 is a perspective view of the embodiment of FIG. 1 after assembly of the kit.
Figure 3:
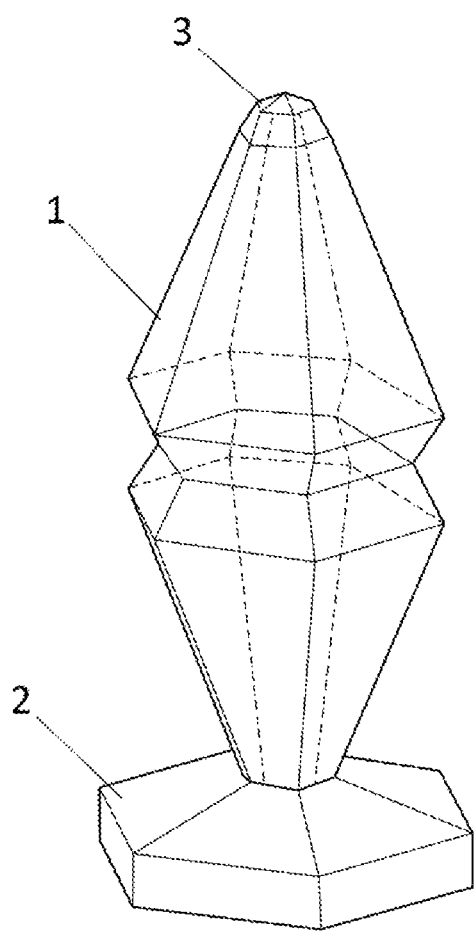
FIG. 3 is a perspective view of the embodiment of FIG. 1 after assembly of the kit without the shade.
Figure 4:
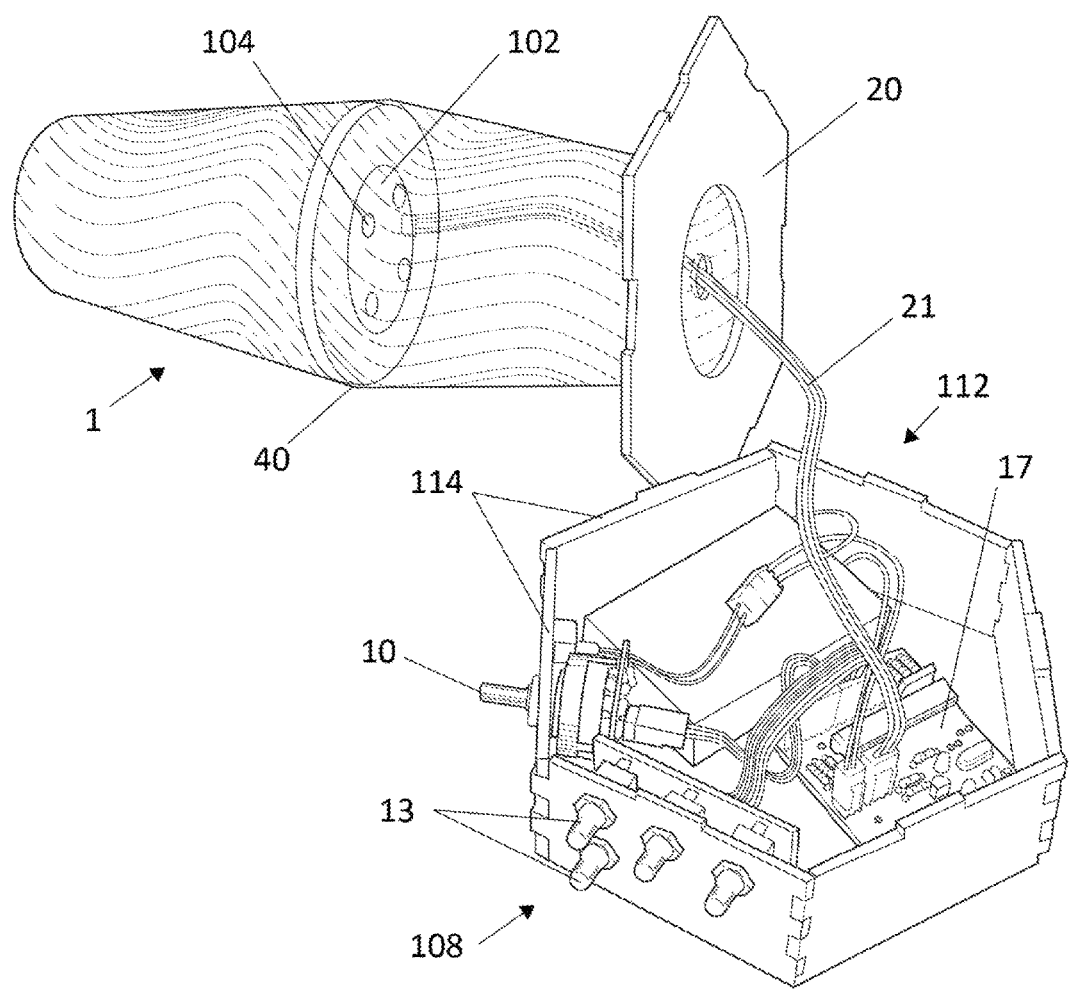
FIG. 4 is a perspective view of the embodiment of FIG. 1 with the top of the base open to show the electronic assemblies inside the base.
Figure 5:
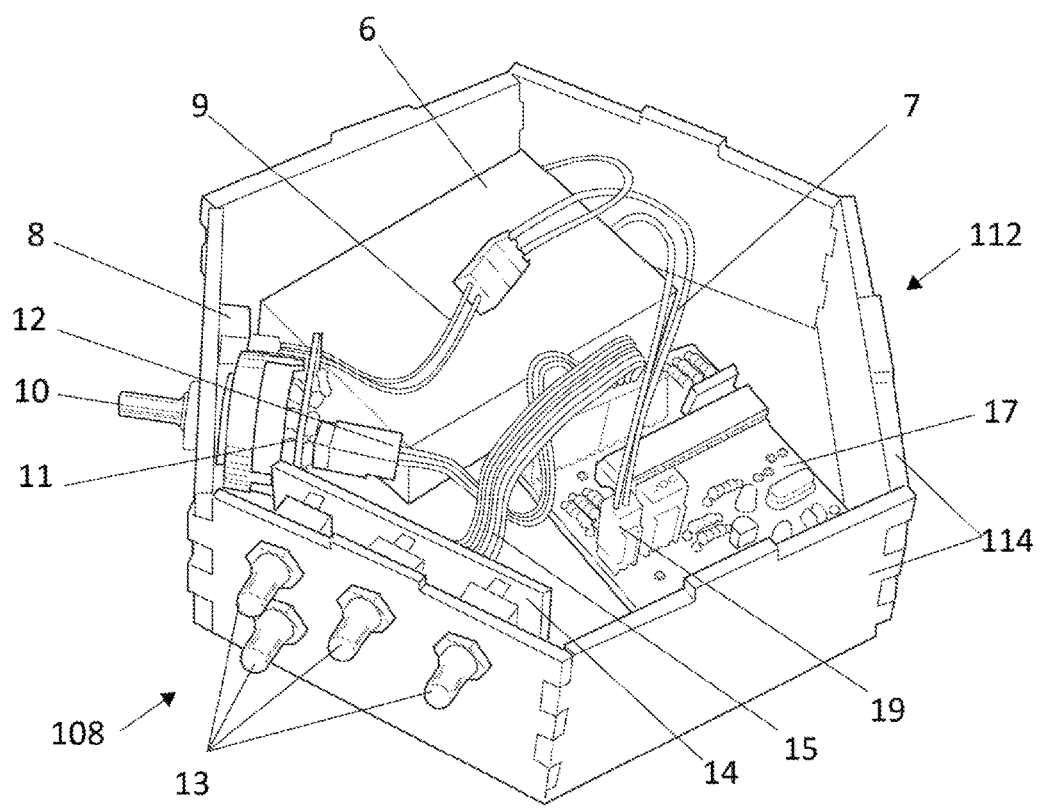
FIG. 5 is a perspective view of the electronic assemblies inside the base of the embodiment of FIG. 1 with the top of the base removed for clarity.

The components of the lamp kit of a preferred embodiment are illustrated in FIG. 1, and the assembled lamp of the preferred embodiment is illustrated in FIGS. 2 and 3. FIGS. 4 and 5 illustrate the lamp of the preferred embodiment with the base open to reveal the electronics inside. The lamp kit can include a lamp body 1, a lamp base 2, a light array 102, a microcontroller assembly 17, a controller 108, an on/off switch 8, a light array cable 21, an on/off cable 9, and a power source cable 7. The microcontroller assembly 17 may include a printed circuit board (PCB) and a processor. The lamp base 2 includes an upper lamp base 20, a lower lamp base 112, and a plurality of lamp base side panels 114. In this embodiment, the lamp base components interlock by means of tabs and slots and are die-cut or laser-cut from sheets of plastic or wood. Assembling the lamp base components helps the user to understand how product housings are designed and assembled.

Figure 8:
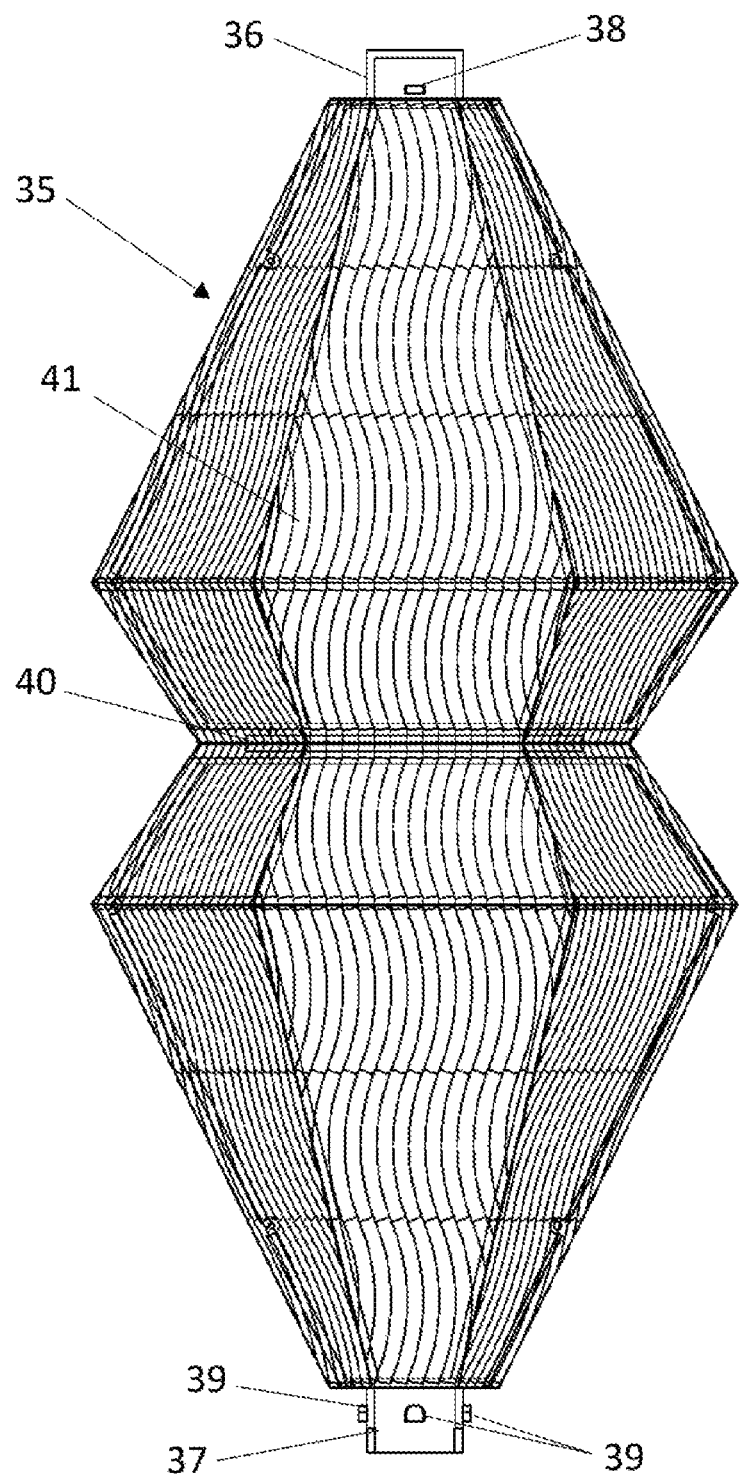
FIG. 8 is a front view of one embodiment of a lamp body.

When assembled, the lamp base 2 supports the transparent lamp body 1 which houses the light array 102. The light array 102 can include a plurality of light sources 104 and a PCB. The light sources 104 are light emitting diodes (LEDs) in this preferred embodiment. Optionally, the light sources can be tri-color or red, green, and blue (RGB) LEDs which allow the processor to control the color displayed by the light sources. FIG. 8 illustrates one half of the lamp body which includes two identical molded plastic parts 35 attached together. Although illustrated as identical parts, it is contemplated that the lamp body can include one or more sections which are different from one another. The lamp body also includes a top mounting element 36 and a bottom mounting element 37. The top mounting element 36 includes top locking elements 38, and the bottom mounting element 37 includes bottom locking elements 39.

Figure 9:
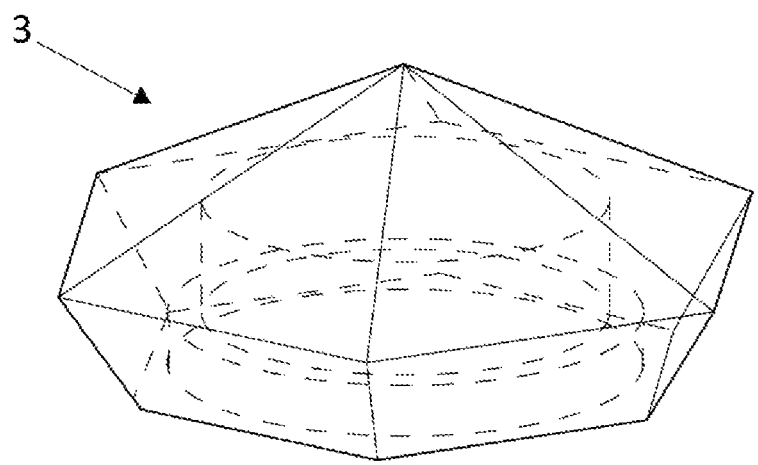
FIG. 9 is a perspective view of one embodiment of a lamp body cap.

The lamp body of one embodiment of the lamp kit is illustrated in FIG. 8. When assembled, a lamp shade 4 is supported by the lamp body 1 at the top mounting element 36 and held in place by the lamp body cap 3 shown in FIG. 9. The lamp body cap 3 attaches to the lamp body 1 at the top mounting element 36 and engages with the top locking elements 38. A plurality of decorative elements 5, 24 can be attached to the lamp shade 4. The lamp can also be used without the lamp shade 4 as illustrated in FIG. 3. In this configuration, the lamp body cap 3 can still be attached to the lamp body 1. The decorative elements allow users to personalize the lamp while learning about artistic principles. In an alternate embodiment of the present invention, the decorative elements 5, 24 may include markers, paint, stickers, beads, glitter, pompoms, ornaments, and the like.

Figure 6:
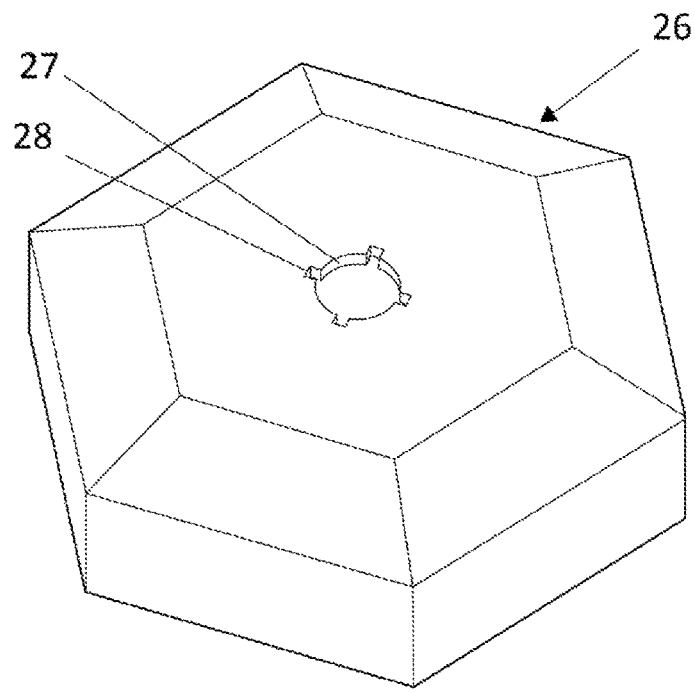
FIG. 6 is a perspective view of the upper lamp base of an alternate embodiment.
Figure 7:
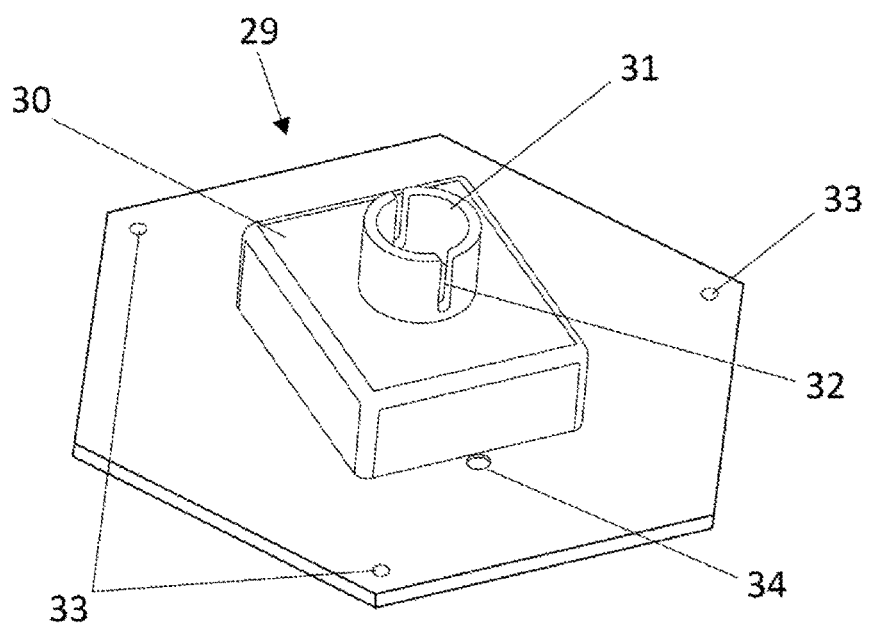
FIG. 7 is a perspective view of the lower lamp base of an alternate embodiment.

FIGS. 6 and 7 illustrate the upper and lower portions of an alternate embodiment of the lamp base. The upper lamp base 26 of FIG. 6 is molded with plastic in this embodiment and includes a hole 27 for accepting the bottom mounting element 37 of the lamp body 1. Slots 28 around the hole 27 accept the bottom locking elements 39 of the lamp body 1. When the lamp body 1 is rotated relative to the top lamp base 26, the bottom locking elements 39 secure the lamp body 1 to the top lamp base 26.

FIG. 7 illustrates the lower lamp base 29 of the alternate embodiment. This lower lamp base 29 is molded with plastic and attaches to the bottom surface of the upper lamp base 26 by means of fasteners at holes 33. The lower lamp base 29 includes a compartment 30 for housing batteries and a hole 34 for accepting a fastener for securing the battery compartment door. A support element 31 engages with and supports the bottom mounting element 37 of the lamp body 1. Openings 32 in the support element 31 accommodate wires attached to the light array 102, allowing the wires to be connected to the electronic circuit.

FIGS. 4 and 5 illustrate the electronic assemblies of the lamp. In FIG. 4, the lamp body 1 and the upper lamp base 20 are detached from the lower lamp base 112 and the lamp base side panels 114 to reveal the electronic assemblies within. The light array 102 is visible inside the transparent lamp body 1 and is held in place at the central portion 40 of the lamp body 1. In this preferred embodiment, the light array 102 includes a plurality of light sources 104 which are RGB LEDs, half shining light upward and half shining light downward. The light sources 104 can be controlled to produce a wide range of colors and intensities by the controller 108. The light array cable 21 comprised of three wires connects the light array 102 to the microcontroller assembly 17. In this preferred embodiment, the firmware in the microcontroller controls the red, green, and blue values of each RGB LED in a serial manner via one wire in the light array cable 21. The other two wires in the light array cable 21 are power and ground. The user connects the electronic assemblies with cables, thereby gaining an understanding of the function of each assembly and how the assemblies interact with one another.

The controller 108 can include a rotary switch 10 and a plurality of potentiometers 13. The potentiometers 13 are mounted to the potentiometer assembly 14 which includes a PCB and other electronic components. A potentiometer cable 15 consisting of six wires connects the potentiometer assembly 14 to the microcontroller assembly 17.

A rotary switch 10 is mounted to a PCB to form the rotary switch assembly 11 which is connected by a rotary switch cable 12 to the microcontroller assembly 17. In this preferred embodiment, rotary switch cable 12 consists of three wires—power, ground, and signal. A rotary switch with four modes would typically require one wire per mode in addition to power and ground. However, this embodiment employs a voltage divider to reduce the number of wires to three. The microcontroller interprets the voltage of the signal wire to determine the mode.

In this embodiment, the power source is a battery pack 6 is connected to the microcontroller assembly via power source cable 7 with two wires, power and ground, terminating in connector 19. The red power wire of battery pack 6 is connected to on/off switch 8 via on/off cable 9 such that on/off switch 8 controls the flow of electricity from battery pack 6 to the various PCBs. It should be understood that the power source may take other forms. For example, the lamp may be plugged into a standard wall outlet. Alternatively, the lamp may be plugged into a computing device, for example via a USB cable, with the computing device providing power for the lamp.

Figure 10:
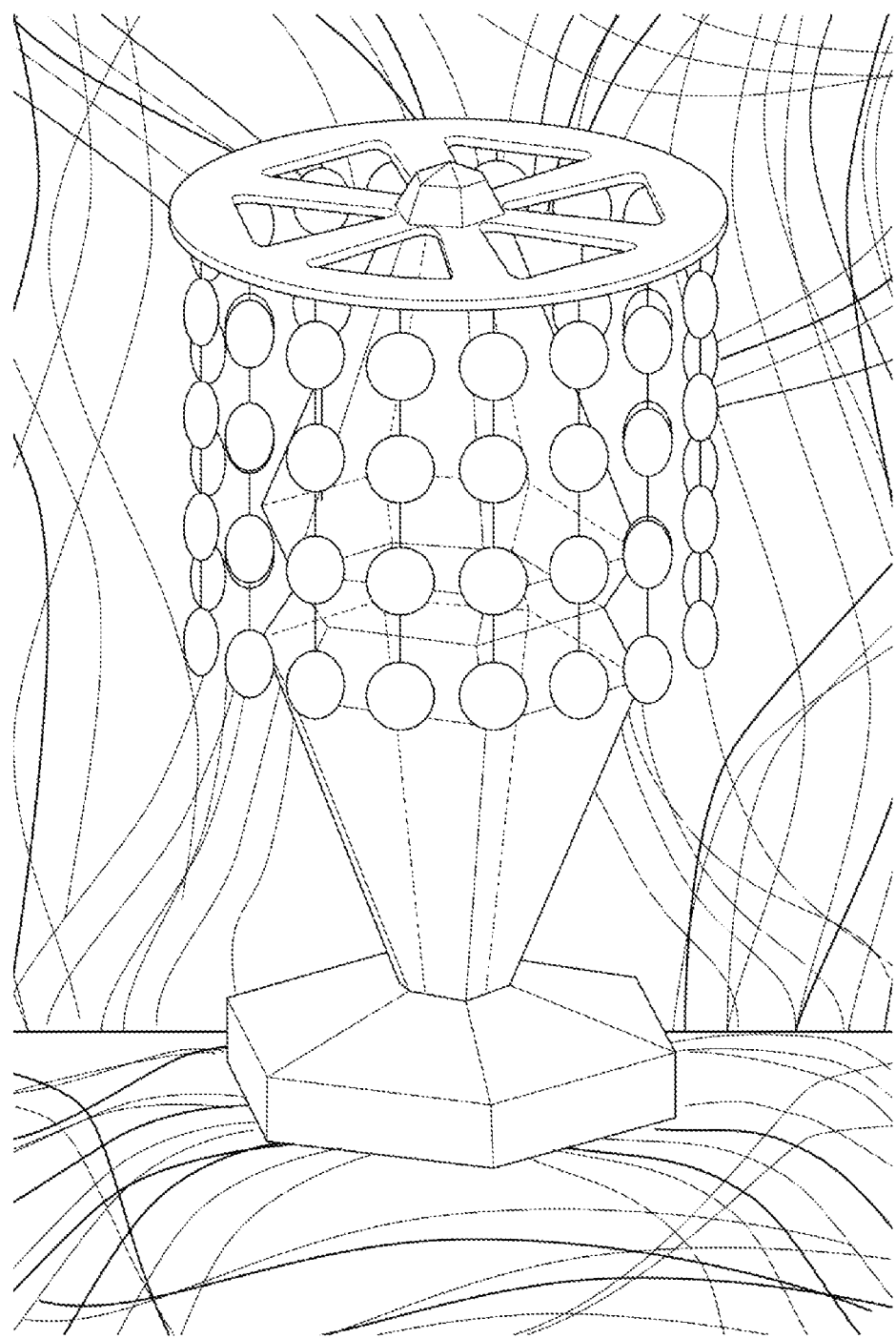
FIG. 10 is a perspective view of a lighting effect created by an embodiment of the lamp.
Figure 20:
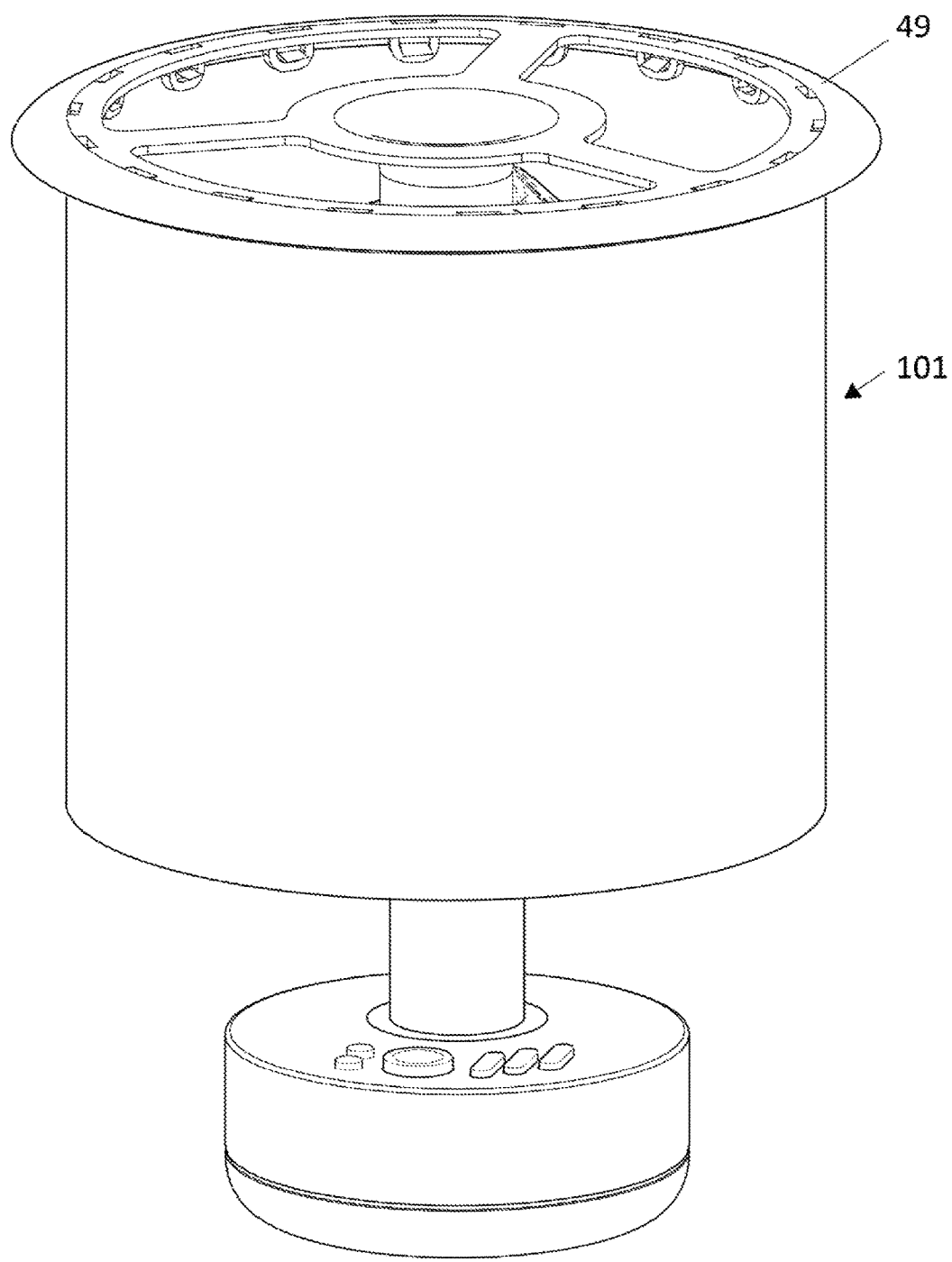
FIG. 20 is a perspective view of an embodiment of the lamp with a removable translucent shade.

The lamp body 1 is molded with a 3-dimensional pattern 41 that acts as lenses to project light from the light array 102 onto surfaces in the environment in which the lamp is used. FIG. 10 illustrates the lighting effect of the third mode (described below) projecting patterns in various colors onto the environment. The lamp body is designed to project light upward from upward-facing LEDs and downward from downward-facing LEDs. The lamp body includes planar surfaces that facilitate decoration with stickers and erasable markers. In an alternate embodiment of the present invention, lamp bodies with alternate patterns may be used to change the projected light patterns and educate the user on optical principles. In another embodiment of the present invention, the lamp body 1 may project a light pattern onto a translucent shade placed around the lamp body 1. Such an embodiment is shown in FIG. 20 and described further herein. This would be advantageous if there are no adequate surfaces within the environment for projection or if the ambient lighting is too bright to display projections onto the environment.

Figure 12:
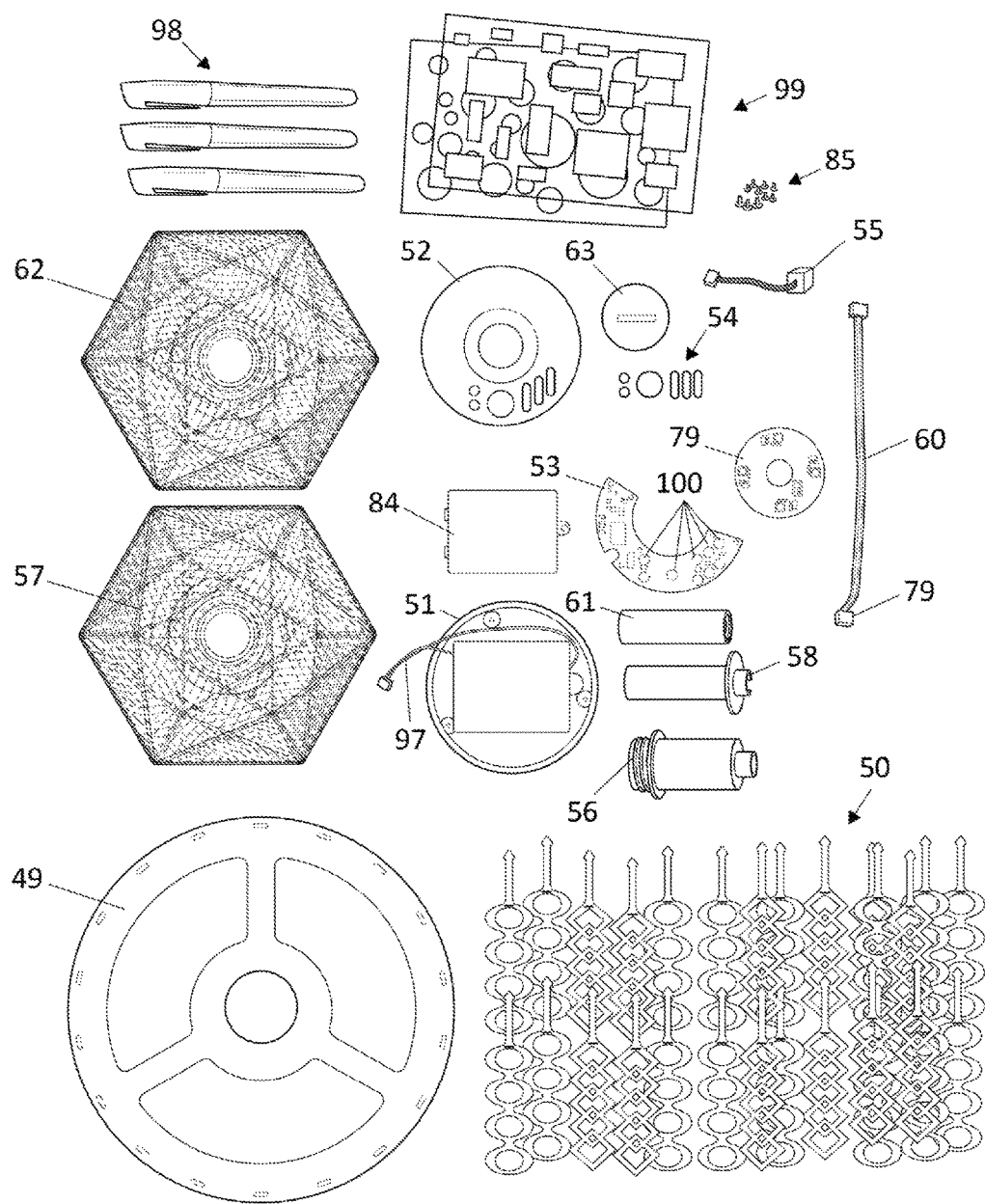
FIG. 12 is a top view of the components that comprise an alternate embodiment of the lamp kit.
Figure 13:
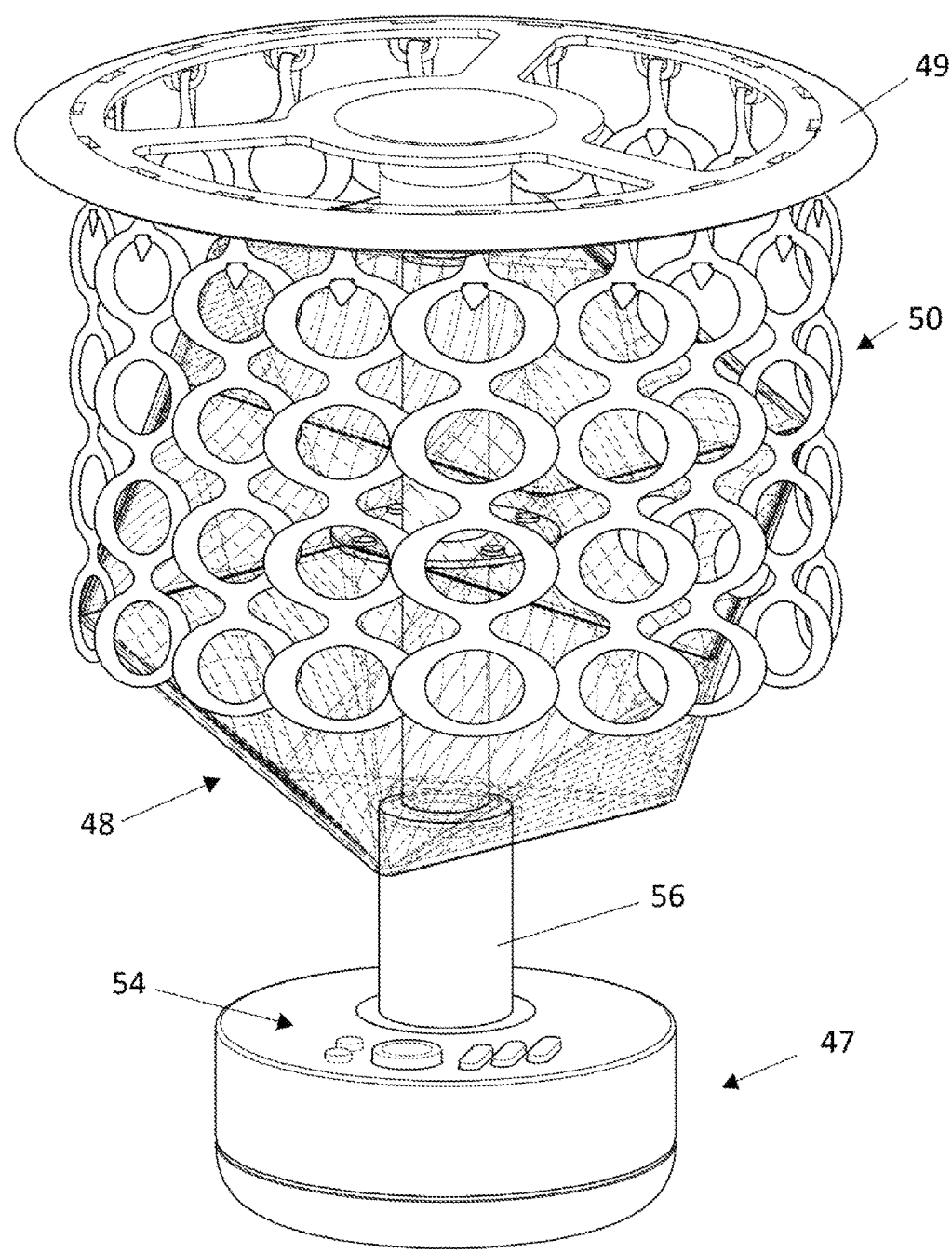
FIG. 13 is a perspective view of the embodiment of FIG. 12 after assembly with a decorative shade.
Figure 14:
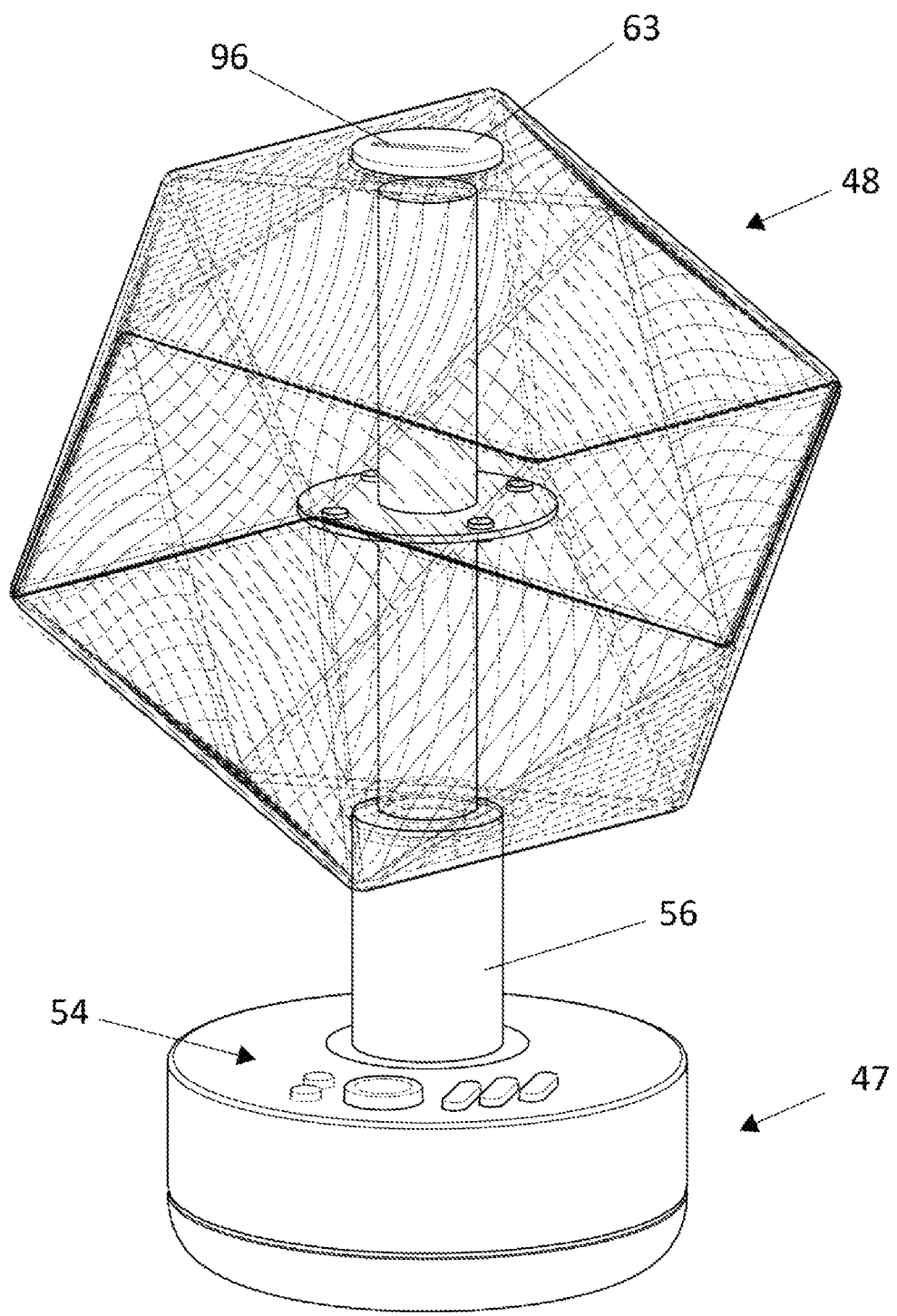
FIG. 14 is a perspective view of the embodiment of FIG. 12 without the shade.

The components of the lamp kit of an alternate embodiment are illustrated in FIG. 12, and the assembled lamp of the alternate embodiment is illustrated in FIGS. 13 and 14. Transparent lamp body 48 is supported by bottom post 56 and lamp base 47. A removable ring 49 can be used to support decorative elements 50. Lighting modes, speeds, and colors are controlled via controller 54, which in this embodiment includes a plurality of buttons.

Figure 15:
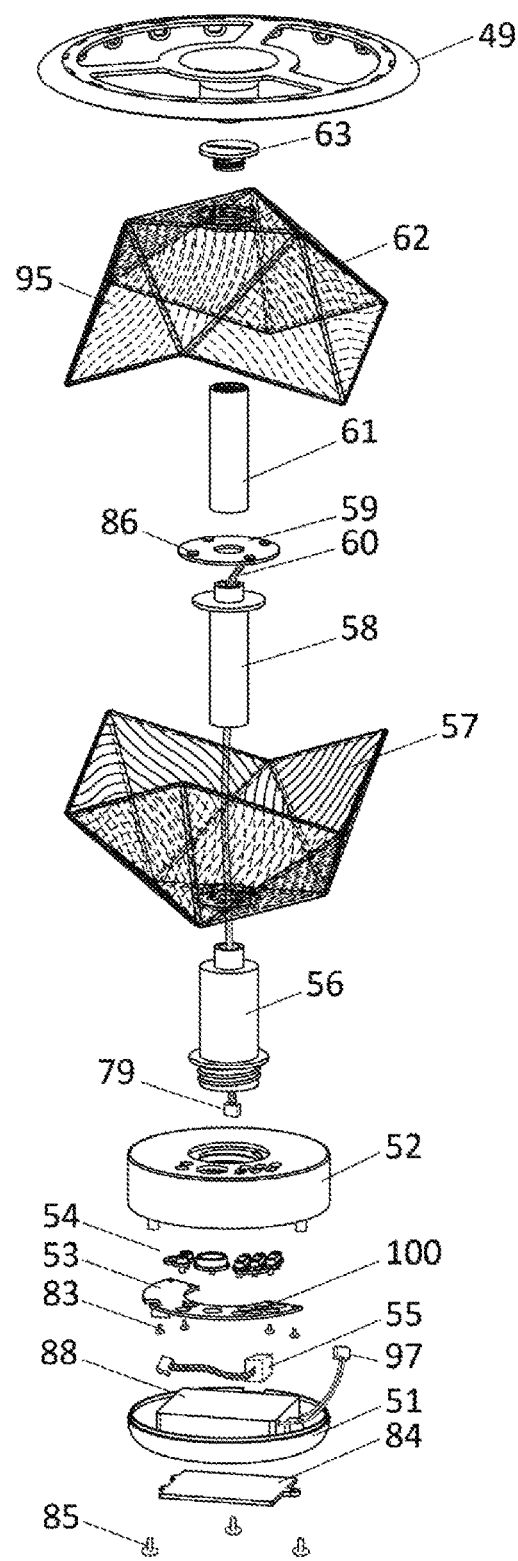
FIG. 15 is an exploded view of the embodiment of FIG. 12.

An exploded view of the alternate embodiment of the lamp is illustrated in FIG. 15. The lamp base 47 is comprised of the upper lamp base 52 and the lower lamp base 51. In this embodiment, the upper lamp base 52 and lower lamp base 51 are connected via fasteners 85 and are molded in plastic. Assembling the lamp components helps the user to understand how product housings are designed and assembled.

Figure 16:
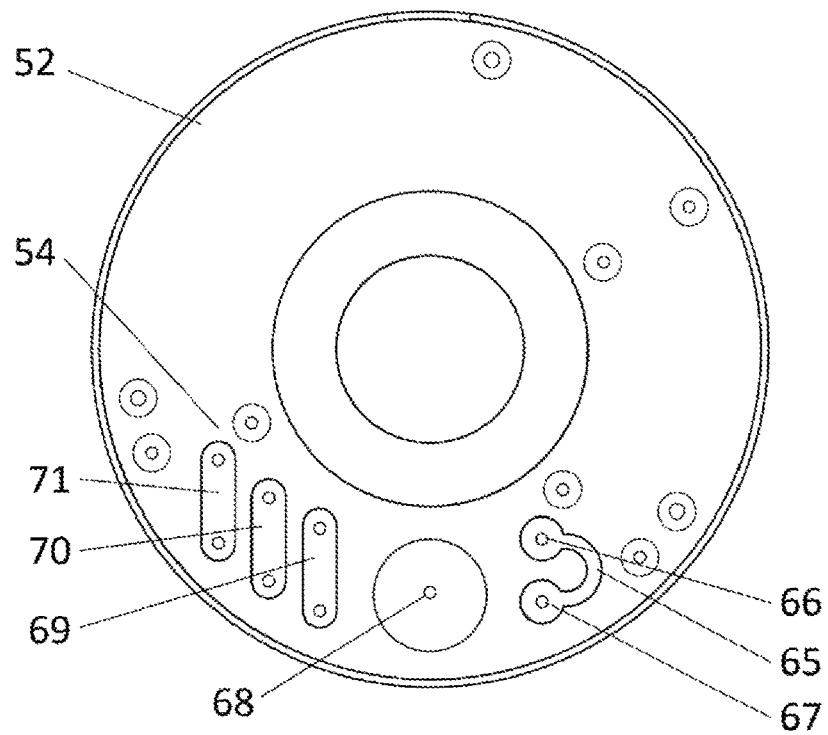
FIG. 16 is a bottom view of the embodiment of FIG. 12 showing the top lamp base with buttons assembled.
Figure 17:
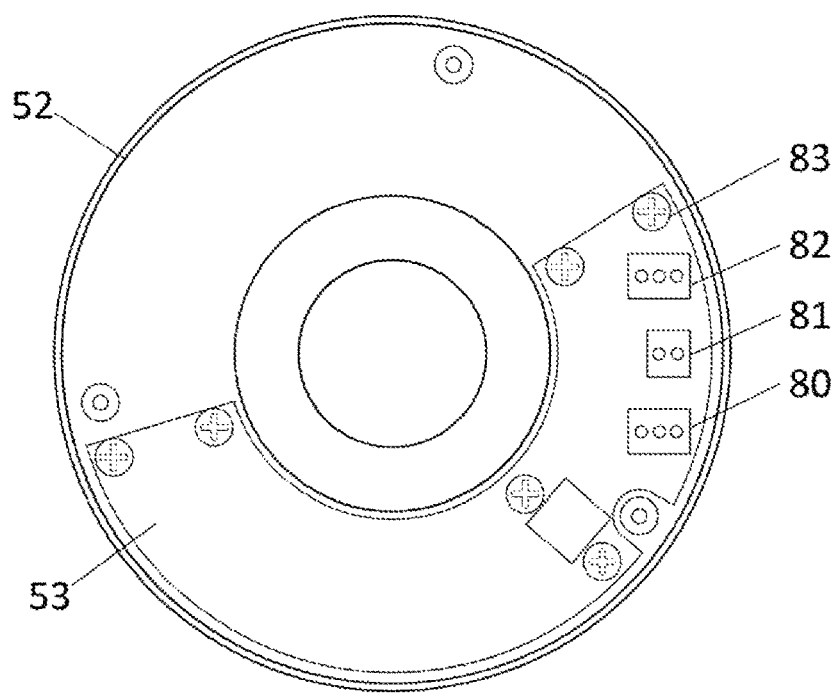
FIG. 17 is a bottom view of the embodiment of FIG. 12 showing the top lamp base with the microcontroller assembly assembled together.

FIG. 16 is a bottom view showing the upper lamp base 52 with buttons 54 assembled. FIG. 17 is a bottom view showing the upper lamp base 52 with the microcontroller assembly 53 assembled together. The microcontroller assembly 53 may be a PCB and include the processor. The lamp is controlled via plastic buttons 54 which are placed inside and extend through the top lamp base 52. The buttons 54 are supported by the microcontroller assembly 53 which is fastened to the top lamp base 52 by screws 83. Pressing on buttons 54 activates switches 100 on the microcontroller assembly 53.

Pressing mode button 68 cycles through the lamp's lighting modes. Speed buttons 65 are comprised of speed "+" button 66 and speed "−" button 67 which increase or decrease the speed of the light patterns, respectively. The LED colors can be controlled by red, green, and blue (RGB) buttons 69, 70, and 71, respectively. The brightness of each color can be controlled by individual "+" and "−" switches.

On/off switch 55 is held between upper lamp base 52 and lower lamp base 51. The user assembles on/off switch 55 by connecting it to connector 80 on the microcontroller assembly 53.

After batteries are inserted into battery compartment 88 in lower lamp base 51, the opening of the battery compartment is covered by battery door 84. The user connects the wires 97 from battery compartment 88 to connector 81 on the microcontroller assembly 53. In this alternate embodiment, lower lamp base 51 is attached to upper lamp base 52 by fasteners 85.

The lamp base 47 supports the transparent lamp body 48 which houses the light array 59 comprised of light sources 86 which, in this embodiment, are light emitting diodes (LEDs). In this alternate embodiment, the transparent lamp body is an icosahedron which is comprised of two identical molded plastic parts 57 and 62 held together by top cap 63, top post 61, middle post 58, and bottom post 56. Identical parts can be used for the lamp body to reduce the cost of injection molds, however the lower lamp base and upper lamp base need not be identical.

Lower lamp body 57 is held in place between middle post 58 and bottom post 56 which are fastened together. Bottom post 56 is fastened to lamp base 47. The light array 59 is connected to a light array cable 60 which pass through middle post 58 and bottom post 56 and terminates in connector 79 which connects to connector 82 on the microcontroller assembly 53. The light array 59 is held in place between middle post 58 and top post 61 which fasten together.

Upper lamp body 62 fits onto top post 61 and is held in place by top cap 63 which fastens to the top post. For easy rotation of top cap 63, the user may insert a coin or flat-head screwdriver into slot 96. Alternatively, ring 49 can fasten to top post 61 in place of top cap 63.

Figure 19:
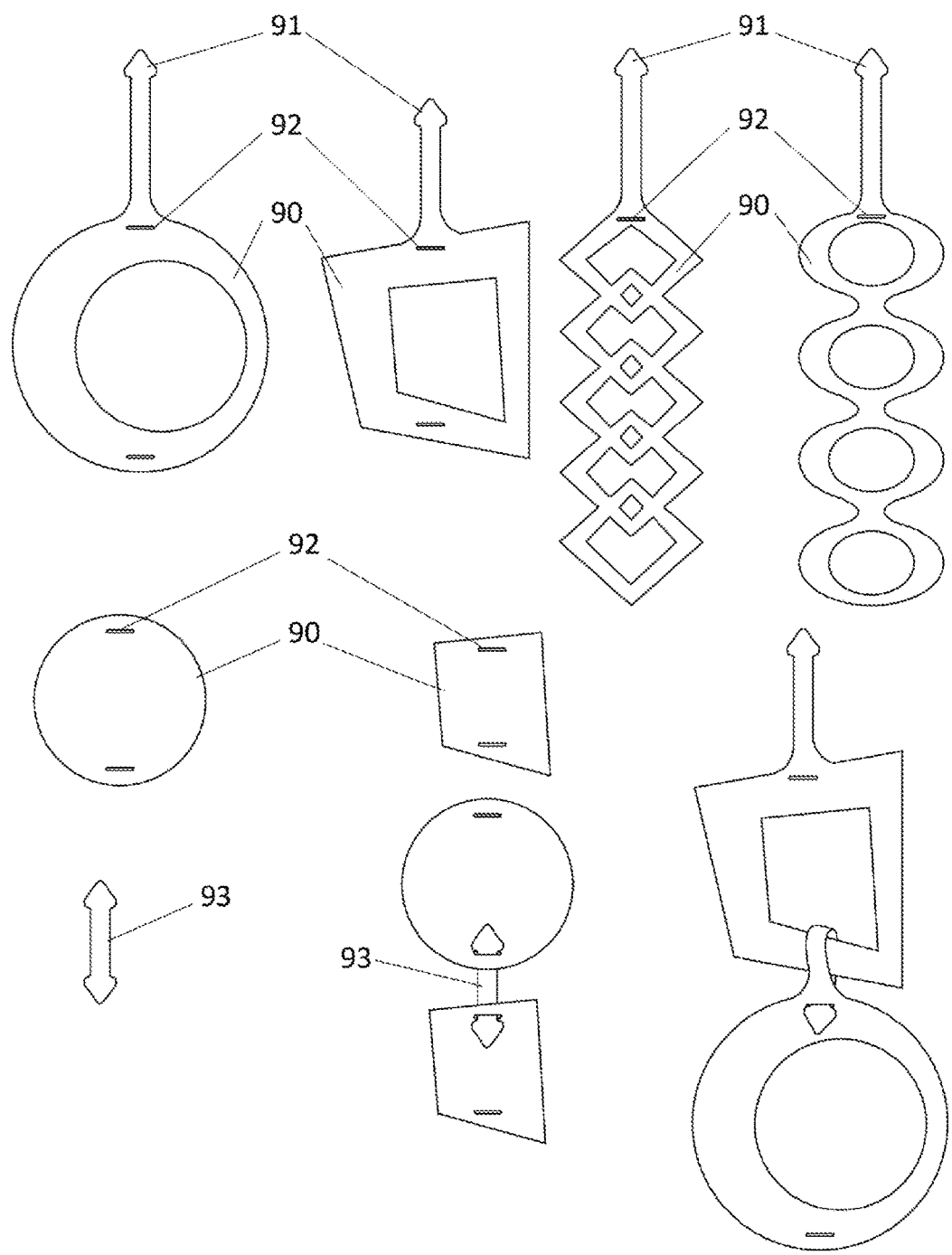
FIG. 19 is a front view of decorative elements that attach to a removable ring fastened to the top of the lamp.

FIG. 19 is a front view of decorative elements 90 that may be attached to ring 49. The decorative elements 90 may have a tab 91 and a slot 92. The tab 91 can be bent and fit through the slot 92 to attach a decorative element to ring 49 or to another decorative element. The decorative elements can also be connected with double-ended tabs 93 which fit through slots in two decorative elements. The decorative elements may be die cut or laser cut from plastic film, paper, or the like.

Figure 18:
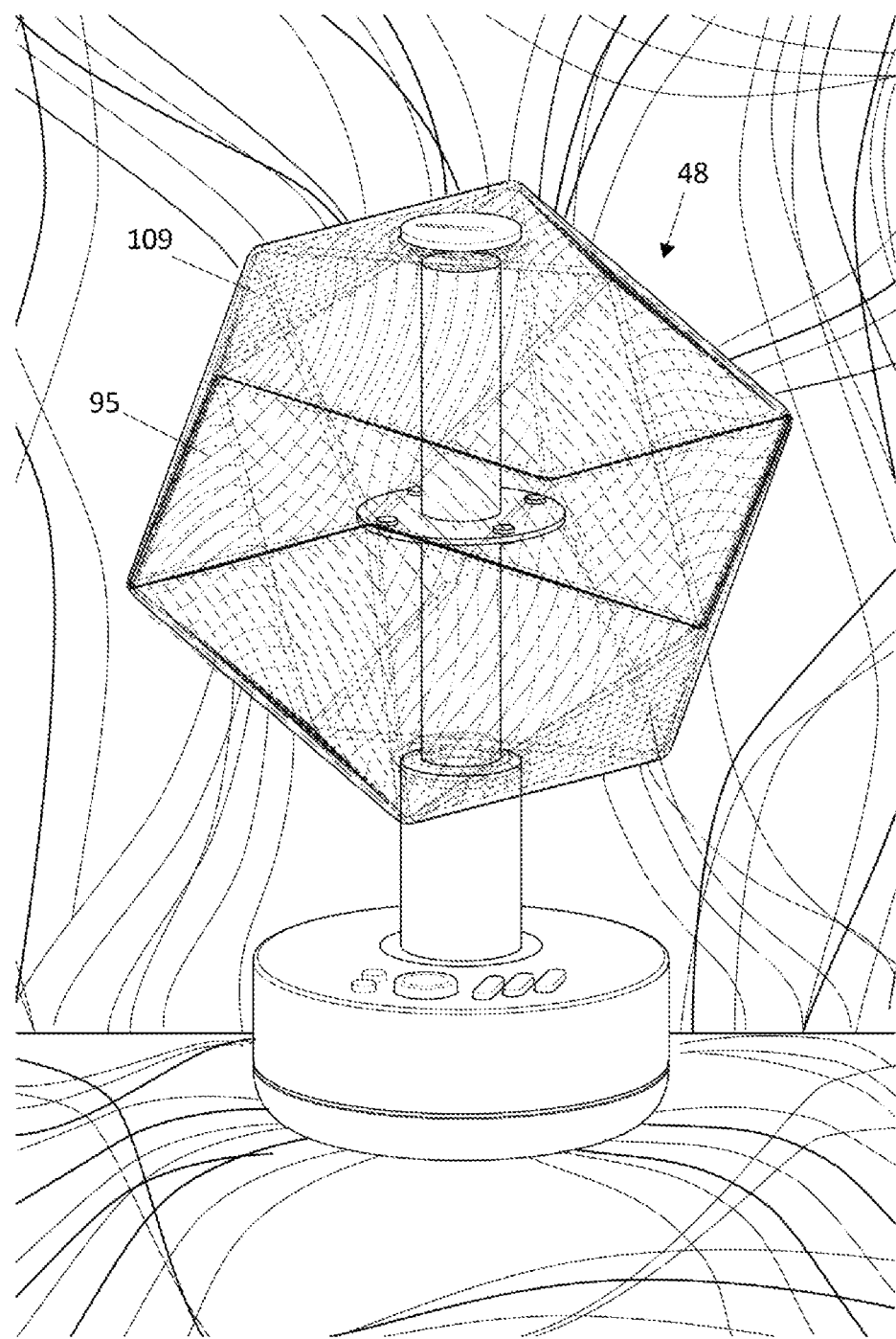
FIG. 18 is a perspective view of a lighting effect created by the embodiment of FIG. 12.

The lamp body 48 is molded with a 3-dimensional pattern 95 that acts as lenses to project light from the light sources 86 onto surfaces in the environment in which the lamp is used. FIG. 18 illustrates the lighting effect of Mode 3 (described below) projecting patterns in various colors onto the environment. The lamp body 48 is designed to project light upward from upward-facing LEDs and downward from downward-facing LEDs. The lamp body includes planar surfaces 109 that facilitate decoration with stickers 99 and erasable markers 98. In an alternate embodiment of the present invention, lamp bodies with alternate patterns may be used to change the projected light patterns and educate the user on optical principles. These patterns may be configured to focus or diffuse the light from the light sources.

FIG. 20 illustrates an alternate embodiment of the present invention with a removable translucent shade 101. In this embodiment, the lamp body 48 may project a light pattern onto a translucent shade 101 placed around the lamp body. This would be advantageous if there are no adequate surfaces within the environment for projection or if the ambient lighting is too bright to display projections onto the environment.

In some embodiments, the lamp has four modes with corresponding lighting effects selected with the controller. In Mode 1, the user sets the red, green, and blue values for the light sources via three potentiometers, or otherwise by the controller. The ability to control the red, green, and blue values helps to teach users how mixing colors with light differs from mixing colors with pigment using the primary colors red, yellow, and blue. In Mode 2, the light sources cycle in unison through a number of colors specified in the firmware. The speed at which the colors change is set by the user via a potentiometer, or otherwise by the controller. In Mode 3, each light source begins in a color specified in the firmware, and each color then moves sequentially through adjacent light sources, giving the appearance of the colors cycling through the plurality of light sources. In Mode 4, the light sources flash while cycling in unison through a number of colors specified in the firmware. The speed at which the colors flash is set by the user via a potentiometer, or otherwise by the controller.

In an alternate embodiment, the on/off switch, rotary switch, and potentiometers are replaced by capacitive sensors that detect the presence of a finger. Capacitive sensors allow the user to control lamp functions via touch rather than manipulation of switches and knobs.

In at least one embodiment, the lamp may include the ability to play music to accompany the lighting effects. The lamp may include a speaker for playing music stored elsewhere, or the lamp may include the ability to store music locally.

In some embodiments, the lamp may include a microphone so that the lighting effects may respond to auditory input. For example, the lighting effect may change in response to the user speaking or clapping. The microphone can be used to detect the beat of music being played so that the lighting effect may be synchronized to the beat.

In an alternate embodiment, the lamp function can be controlled by the user via software. For example, the microcontroller assembly can be connected via data cable to a computer with which the user can control the lamp, or write or edit software that can be downloaded to the lamp to affect its function. In another example, the microcontroller can be wirelessly connected to and controlled by a computer, smartphone, or tablet. Software on the computer, smartphone, or tablet may permit low-level programming by the user, or the programming may be simplified by using visual drag-and-drop programming. The ability for users to program the lamp functionality can educate users on software principles.

Figure 11:
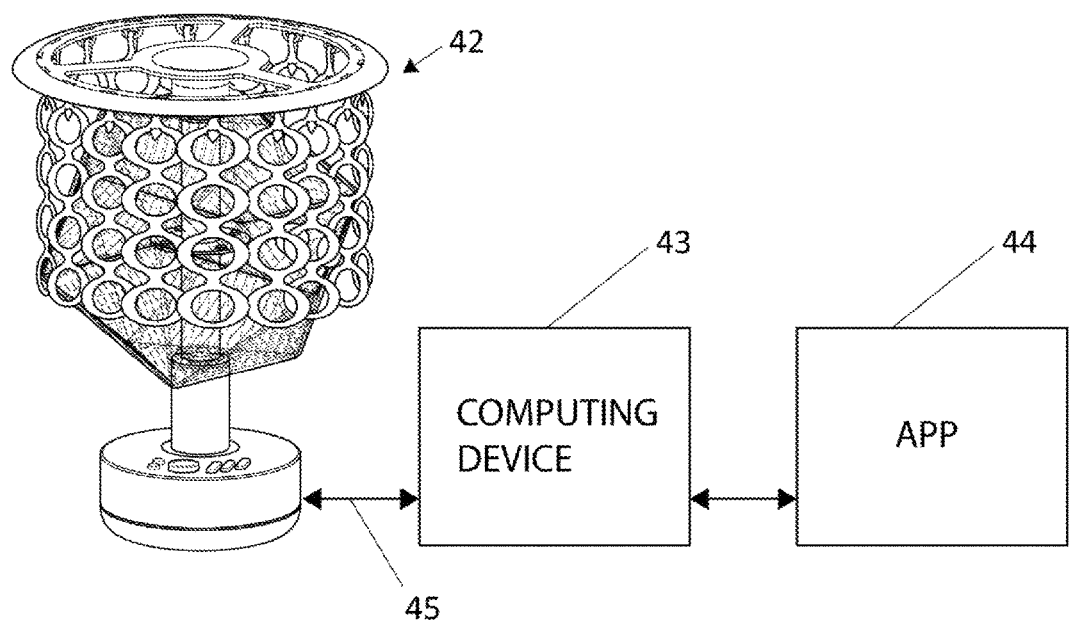
FIG. 11 is a schematic diagram of a computer controlled lamp of an alternate embodiment.

FIG. 11 is a schematic diagram of a computer controlled lamp of an alternate embodiment of the present invention. Lamp 42 is connected to computing device 43 by means of connection 45. App 44 runs on computing device 43 and controls lamp 42. Connection 45 may be a wire, or the connection may be wireless, such as Bluetooth, Bluetooth low energy, near field communication, RFID, or other means. Computing device 43 may be a computer, or it may be a mobile computing device such as a smartphone, an electronic tablet, or a remote controlled device. App 44 may be a software program running locally on computing device 43, or it may be running on a remote computing device and accessed by the local computing device 43.

In some embodiments, users can create and save customized lighting effects. These saved lighting effects can be shared with other lamp owners to provide social engagement.

To further educate the user on mechanical skills and design principles, the user may be encouraged to make her own lamp base and decorations with hand tools, power tools, 3D printers, laser cutters, and the like. To further educate the user on electronics and circuits, the printed circuit boards may be made larger than necessary in order to accommodate explanatory graphics and text. Conversely, the various electronic assemblies may be condensed onto one small circuit. The physical switches and controls may be replaced by other user interfaces such as a touch screen, gestural control, or voice control. The lighting effect modes may differ significantly from those described above while remaining within the scope of this disclosure.

Following is a list of the components included in the lamp kit of the preferred embodiment:

1. Lamp base housing: top housing, bottom housing, battery door, screw for battery door.

2. Lamp body: left and right halves.
3. Lamp shade.
4. Lamp body cap.
5. Lamp decorations: plastic cord for hanging decorations, assorted sequins, s-hooks for connecting sequins, assorted stickers, dry-erase markers, assorted plastic gems.
6. Microcontroller PCB assembly: contains microcontroller.
7. Potentiometer PCB assembly: contains four potentiometers with knobs.
8. Rotary switch PCB assembly: contains rotary switch with knob.
9. Light array assembly: contains eight RGB LEDs.
10. On/off switch.
11. Battery pack: accommodates three AA batteries.
12. Cables: potentiometer cable, rotary switch cable, light array cable, on/off switch cable, battery pack cable.
13. Phillips screwdriver.
14. Instruction manual.
15. Cardboard box for containing the kit.

Following is a list of the components included in the lamp kit of the alternate embodiment:
1. Lamp base housing: top housing, bottom housing, battery door, screw for battery door.
2. Lamp body: top and bottom halves.
3. Lamp shade.
4. Lamp body cap.
5. Top post.
6. Middle post.
7. Bottom post
8. Lamp decorations: assorted sequins, assorted stickers, dry-erase markers, assorted plastic gems.
9. Microcontroller PCB assembly: contains microcontroller and nine switches.
10. Light array assembly: contains eight RGB LEDs.
11. On/off switch.
12. Battery pack: accommodates three AA batteries.
13. Cables: light array cable, on/off switch cable, battery pack cable.
14. Phillips screwdriver.
15. Instruction manual.
16. Cardboard box for containing the kit It is to be understood that the present invention is not limited to the embodiments described above and illustrated herein but encompasses any and all variations falling within the scope of the invention. For example, the shape and materials of the lamp components may vary considerably from those described above. The light source need not be comprised of LEDs;
incandescent or fluorescent bulbs may be used.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A lamp kit comprising: a lamp base; a lamp body removably mechanically couplable to the lamp base; a light array, the light array including a plurality of light sources; a processor; a controller; a light array cable; and a power source cable; wherein the processor is configured to operate in one of a selected plurality of lighting modes, each of the plurality of lighting modes being selectable by the controller when the lamp kit is assembled.

2. The lamp kit of claim 1, further comprising a lamp shade and a plurality of decorative elements, wherein the lamp shade is removably mechanically couplable to the upper lamp body, and further wherein the plurality of decorative elements are removably couplable to the lamp shade.

3. The lamp kit of claim 1, wherein the controller includes a plurality of push buttons.

4. The lamp kit of claim 1, wherein at least a portion of the lamp body is transparent and is shaped to focus light from the light array.

5. The lamp kit of claim 1, wherein at least a portion of the lamp body is transparent and is shaped to disperse light from the light array.

6. The lamp kit of claim 1, wherein the light sources are red, green, and blue light emitting diodes.

7. The lamp kit of claim 6, wherein in at least one of the plurality of lighting modes the color displayed by the light array is adjustable by the controller.

8. The lamp kit of claim 7, wherein the color displayed by the light array is adjustable by individually adjusting the brightness levels of the red, green, and blue colors of the light sources.

9. A lamp device comprising:
a lamp base;
a lamp body removably mechanically coupled to the lamp base;
a light array disposed within the lamp body, the light array including a plurality of light sources;
a power source;
a processor electrically coupled to the power source and to the light array; and
a controller electrically coupled to the processor;
wherein the processor is configured to operate in one of a selected plurality of lighting modes, each of the plurality of lighting modes being selectable by the controller.

10. The lamp device of claim 9, further comprising a lamp shade and a plurality of decorative elements, wherein the lamp shade is removably mechanically coupled to the upper lamp body, and further wherein the plurality of decorative elements are removably couplable to the lamp shade.

11. The lamp device of claim 9, wherein the controller includes a plurality of push buttons.

12. The lamp kit of claim 9, wherein at least a portion of the lamp body is transparent and is shaped to focus light from the light array.

13. The lamp kit of claim 9, wherein at least a portion of the lamp body is transparent and is shaped to disperse light from the light array.

14. The lamp device of claim 9, wherein the light sources are red, green, and blue light emitting diodes.

15. The lamp device of claim 14, wherein in at least one of the plurality of lighting modes the color displayed by the light array is adjustable by the controller.

16. The lamp device of claim 15, wherein the color displayed by the light array is adjustable by individually adjusting the brightness levels of the red, green, and blue colors of the light sources.

17. An educational system for teaching a student mechanical and electrical assembly techniques and computer programming, the system comprising:
- a lamp base;
- a lamp body removably mechanically coupled to the lamp base;
- a light array disposed within the lamp body, the light array including a plurality of light sources;
- a power source;
- a processor electrically coupled to the power source and to the light array; and
- a computing device in communication with the processor;

wherein the student provides input to the processor via the computing device to control the functioning of the lamp.

18. The educational system of claim 17, wherein the processor is configured to operate in one of a selected plurality of lighting modes, each of the plurality of lighting modes being selectable by the student via the computing device.

19. The educational system of claim 17, wherein the color of the plurality of light sources is programmable by the student using the computing device.

20. The educational system of claim 17, wherein custom lighting modes are provided to the processor via the computing device.

* * * * *